United States Patent
Kerner et al.

(10) Patent No.: US 8,032,738 B2
(45) Date of Patent: Oct. 4, 2011

(54) METHOD FOR THE START-UP OF NUMERICAL CONTROLS OF MACHINE TOOLS OR PRODUCTION MACHINERY AND NUMERICAL CONTROL FOR MACHINE TOOLS OR PRODUCTION MACHINERY

(75) Inventors: Norbert Kerner, Traunwalchen (DE); Georg Zehentner, Teisendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 1273 days.

(21) Appl. No.: 11/637,493

(22) Filed: Dec. 12, 2006

(65) Prior Publication Data
US 2007/0142946 A1  Jun. 21, 2007

(30) Foreign Application Priority Data
Dec. 17, 2005  (DE) .......................... 10 2005 060 601

(51) Int. Cl.
*G06F 9/00* (2006.01)
*G05B 19/18* (2006.01)
(52) U.S. Cl. ....................... 713/1; 713/2; 700/2; 700/96
(58) Field of Classification Search .................. 713/1, 2; 700/2, 96
See application file for complete search history.

(56) References Cited

U.S. PATENT DOCUMENTS

| | | | | |
|---|---|---|---|---|
| 4,727,475 A | * | 2/1988 | Kiremidjian | 710/104 |
| 4,964,038 A | * | 10/1990 | Louis et al. | 710/9 |
| 5,249,687 A | * | 10/1993 | Rosenbaum et al. | 209/3.3 |
| 5,321,829 A | * | 6/1994 | Zifferer | 714/46 |
| 5,446,897 A | * | 8/1995 | Mathias et al. | 709/220 |
| 5,481,750 A | * | 1/1996 | Parise et al. | 709/220 |
| 5,715,475 A | * | 2/1998 | Munson et al. | 710/10 |
| 5,734,865 A | * | 3/1998 | Yu | 709/250 |
| 6,381,502 B1 | * | 4/2002 | Rudder et al. | 700/2 |
| 6,397,280 B1 | * | 5/2002 | Nitschke et al. | 710/110 |
| 6,574,234 B1 | | 6/2003 | Myer et al. | |
| 6,614,545 B1 | * | 9/2003 | Langer et al. | 358/1.15 |
| 6,690,981 B1 | * | 2/2004 | Kawachi et al. | 700/83 |
| 6,771,164 B1 | * | 8/2004 | Fink | 340/310.11 |
| 6,937,366 B2 | * | 8/2005 | Ejiri | 358/434 |
| 7,010,379 B2 | * | 3/2006 | Maske et al. | 700/116 |

(Continued)

FOREIGN PATENT DOCUMENTS
DE   103 18 451 A1   11/2004

*Primary Examiner* — Nitin Patel
*Assistant Examiner* — Zahid Choudhury
(74) *Attorney, Agent, or Firm* — Brinks Hofer Gilson & Lione (57) ABSTRACT

A method for the start-up of a numerical control of machine tools or production machinery, wherein the numerical control includes a main computer and a follow-up device, which are connected with each other via a data transmission network, wherein the follow-up device is addressable by the main computer via a logical address and a hardware address, with information regarding a physical address of the follow-up device in the data transmission network, is allocated to the logical address. The method includes sequentially requesting in a set-up mode of operation of the main computer allocating information regarding a logical address and a hardware address from an operator for the follow-up device and other follow-up devices to whose logical address no hardware address had been allocated. The method further including storing the logical address and the hardware address in a memory unit after the allocating information has been performed.

24 Claims, 7 Drawing Sheets

U.S. PATENT DOCUMENTS

| | | | |
|---|---|---|---|
| 7,174,231 B2* | 2/2007 | Peng et al. | 700/96 |
| 7,372,861 B2* | 5/2008 | Tomizawa | 370/401 |
| 7,830,876 B2* | 11/2010 | Ban | 370/389 |
| 2002/0062450 A1* | 5/2002 | Carlson et al. | 713/200 |
| 2003/0017870 A1* | 1/2003 | Klein | 463/25 |
| 2003/0137970 A1* | 7/2003 | Odman | 370/350 |
| 2004/0024988 A1* | 2/2004 | Chauvel et al. | 712/34 |
| 2004/0064559 A1* | 4/2004 | Kupst et al. | 709/226 |
| 2004/0133690 A1* | 7/2004 | Chauffour et al. | 709/229 |
| 2004/0153207 A1* | 8/2004 | Peck | 700/214 |
| 2004/0179482 A1 | 9/2004 | Rusu | |
| 2004/0199703 A1* | 10/2004 | Wurth et al. | 710/306 |
| 2004/0201631 A1* | 10/2004 | Keller et al. | 345/853 |
| 2004/0208184 A1* | 10/2004 | Tanaka et al. | 370/397 |
| 2005/0075746 A1* | 4/2005 | Malone et al. | 700/97 |
| 2005/0141302 A1* | 6/2005 | Maeda et al. | 365/200 |
| 2005/0166206 A1* | 7/2005 | Parson | 718/104 |
| 2005/0256942 A1* | 11/2005 | McCardle et al. | 709/220 |
| 2006/0080379 A1* | 4/2006 | Song et al. | 709/200 |
| 2006/0195609 A1* | 8/2006 | Han | 709/245 |
| 2007/0066221 A1* | 3/2007 | Shim et al. | 455/41.2 |
| 2007/0162615 A1 | 7/2007 | Rusu | |
| 2008/0009266 A1* | 1/2008 | Yamasaki et al. | 455/411 |
| 2008/0059615 A1* | 3/2008 | Izutani | 709/222 |
| 2008/0072042 A1* | 3/2008 | Okuyama et al. | 713/164 |
| 2008/0125037 A1* | 5/2008 | Ibrahim et al. | 455/41.2 |
| 2008/0212534 A1* | 9/2008 | Shitama et al. | 370/331 |
| 2008/0221715 A1* | 9/2008 | Krzyzanowski et al. | 700/90 |
| 2008/0279107 A1* | 11/2008 | Sridhar et al. | 370/241 |
| 2008/0288873 A1* | 11/2008 | McCardle et al. | 715/735 |
| 2008/0298357 A1* | 12/2008 | Ban | 370/389 |
| 2009/0144444 A1* | 6/2009 | Chauffour et al. | 709/238 |

* cited by examiner

| Control Unit 1   | ADR1; ID1 |
|------------------|-----------|
| Control Unit 2   | ADR2; ID2 |
| PLC              | ADR3; ID3 |
| Inverter Module 1| ADR4; ID4 |
| Inverter Module 2| ADR5; ID5 |

| Control unit 1 | ADR1; ID1 |
|---|---|
| Control unit 2 | ADR2; ID2 |
| Inverter Module 1 | ADR3; ID3 |
| Inverter Module 2 | ADR4; ID4 |
| Inverter Module 3 | ADR5; ID5 |
| Inverter Module 4 | ADR6; ID6 |
| Inverter Module 5 | ADR7; ID7 |
| Inverter Module 6 | ADR8; ID8 |
| Inverter Module 7 | ADR9; ID9 |
| Inverter Module 8 | ADR10; ID10 |
| Inverter Module 9 | ADR11; ID11 |
| Inverter Module 10 | ADR12; ID12 |

METHOD FOR THE START-UP OF NUMERICAL CONTROLS OF MACHINE TOOLS OR PRODUCTION MACHINERY AND NUMERICAL CONTROL FOR MACHINE TOOLS OR PRODUCTION MACHINERY

Applicants claim, under 35 U.S.C. §119, the benefit of priority of the filing date of Dec. 17, 2005 of a German patent application, copy attached, Serial Number 10 2005 060 601.6, filed on the aforementioned date, the entire contents of which is incorporated herein by reference.

BACKGROUND OF THE INVENTION

1. Field of the Invention

The present invention relates to a method for the start-up of a numerical control of machine tools or production machinery, wherein the numerical control includes a main computer and at least one follow-up device, which are connected with each other via a data transmission network, wherein the at least one follow-up device can be addressed by the main computer via a logical address, to which a hardware address with information regarding the physical address of the at least one follow-up device is allocated through the data transmission network.

The present invention furthermore relates to a numerical control for machine tools or production machinery.

2. Discussion of Related Art

At present, numerical controls (NC) are primarily utilized for the control of machine tools or production machinery. In order to design such numerical controls as flexibly as possible, they are often modularly constructed. In the course of this, several follow-up devices, such as control units, inverter modules, or also programmable logic controls (PLCs), for example, are connected to a main computer.

The main computer makes the user interfaces required for operating the numerical control available, such as keyboards and monitors, and is used for the preparation, storage and processing of programs. Closed-loop controls, for example, are contained in the control units and are used for controlling inverter modules, which in turn control motors. The control units furthermore include digital and/or analog interfaces for recording actual values, which are continuously required for controlling the control unit during a program run. The actual values to be recorded can be, for example, positional (location) values, velocity values, acceleration values, or also electrical current values. PLCs are used for triggering switching processes as a function of circuit conditions, for example limit stop switches. The follow-up devices are controlled by micro-processors, the same as the main computer. The main computer and the follow-up devices are connected by a data transmission network for transmitting data.

The modular construction has the advantage that, depending on how many and which follow-up devices are connected to a main computer of a numerical control, the most diverse requirements can be met. For example, it is possible by the same main computer to control different machine tools (triple-shaft and quintuple-shaft milling machines), production installations with different numbers of drive systems, or also production robots having a different number of servo-controlled joints, by varying the follow-up devices. Moreover, modular numerical controls can be easily expanded later.

So that the main computer can address the follow-up devices independently of each other, they have individual hardware addresses allocated to them. Furthermore, in order to know which follow-up device has what function, it is necessary to allocate a hardware address to each logical address in the main computer. Only then is it possible for the main computer to determine, for example, which control unit, or which inverter module, must be addressed for displacing a defined feed shaft of a machine tool to be controlled.

Up to now, the allocation of the logical address to the hardware address had to be performed manually, for example by a manual entry of the hardware addresses in the main computer by a technician during the start-up of the machine tool or production machinery. A further possibility exists in entering their logical address directly into the follow-up devices. This can take place, for example, by setting a code switch, or by entering a specific code word into a memory in the follow-up device, which in turn can be read out via the data interface of the follow-up device. However, both methods are quite elaborate and prone to errors, particularly in connection with voluminous machinery containing a large number of follow-up devices.

OBJECTS AND SUMMARY OF THE INVENTION

It is therefore an object of the present invention to disclose a method, by which the start-up of numerical controls of machine tools or production machinery can be simplified.

This object is attained by a method for the start-up of a numerical control of machine tools or production machinery, wherein the numerical control includes a main computer and a follow-up device, which are connected with each other via a data transmission network, wherein the follow-up device is addressable by the main computer via a logical address and a hardware address, with information regarding a physical address of the follow-up device in the data transmission network, is allocated to the logical address. The method includes sequentially requesting in a set-up mode of operation of the main computer allocating information regarding a logical address and a hardware address from an operator for the follow-up device and other follow-up devices to whose logical address no hardware address had been allocated. The method further including storing the logical address and the hardware address in a memory unit after the allocating information has been performed.

It is a further object of the present invention to disclose a numerical control for machine tools or production machinery.

This object is attained by a numerical control for machine tools or production machinery that includes a main computer and a follow-up device connected with the main computer via a data transmission network, wherein the follow-up device is addressable by the main computer via a logical address and a hardware address, with information regarding a physical address of the follow-up device in the data transmission network, is allocated to the logical address, wherein the main computer and the follow-up device are designed for carrying out a method for the start-up of a numerical control of machine tools or production machinery. The method performed by the main computer and the follow-up device includes sequentially requesting in a set-up mode of operation of the main computer allocating information regarding a logical address and a hardware address from an operator for the follow-up device and other follow-up devices to whose logical address no hardware address had been allocated. The method further including storing the logical address and the hardware address in a memory unit after the allocating information has been performed.

A method for starting-up a numerical control of machine tools or production machinery is now being proposed, wherein the numerical control includes a main computer and at least one follow-up device, which are connected with each other via a data transmission network. The at least one follow-up device can be addressed from the main computer by a logical address, to which a hardware address containing information regarding the physical addressing of the at least one follow-up device via the data transmission network is allocated. In a set-up mode of operation, the main computer sequentially requests allocation information from an operator regarding a logical address and a hardware address for follow-up devices to whose logical address no hardware address had been allocated, and stores this in a memory unit after the allocation has been performed.

In a first preferred embodiment the main computer requests the allocation information by outputting the logical address of the follow-up device to be allocated on a display screen. Thereupon an operator initiates the transmission of the hardware address to the main computer by actuating an operating element at the follow-up device to be allocated.

In a second preferred embodiment, the request for the allocation information takes place in that, by using the hardware address, the main computer switches on a signal unit at the follow-up device to be allocated and displays a list of logical addresses on the display screen. Thereupon, an operator selects the logical address belonging to the follow-up device with the switched-on signal unit from the displayed list by an input device.

In a third preferred embodiment, the request for the allocation information takes place in that the main computer displays a follow-up device to be allocated, as well as a list of hardware addresses, on the display screen. Allocation takes place in that the operator sequentially selects hardware addresses from the list by the input device, and the main computer switches on a signal unit at the selected follow-up device by using the hardware address. If the operator determines by the switched-on signal unit that the actually selected hardware address corresponds to the follow-up address to be allocated, he confirms the completed allocation to the main computer via the input device.

It is particularly advantageous if in the course of each switch-on of the numerical control the computer checks whether a hardware address is allocated to each logical address and, if allocation information is lacking, switches to the start-up mode of operation.

In this case it is practical if the allocation information is stored in the form of a parameter data set. Non-volatile memories are particularly suited for storing the parameter data set.

Further advantages and details of the present invention ensue from the following description of preferred methods for the start-up of a numerical control of machine tools or production machinery by the drawings.

DETAILED DESCRIPTION OF THE PREFERRED EMBODIMENTS

Figure 1:
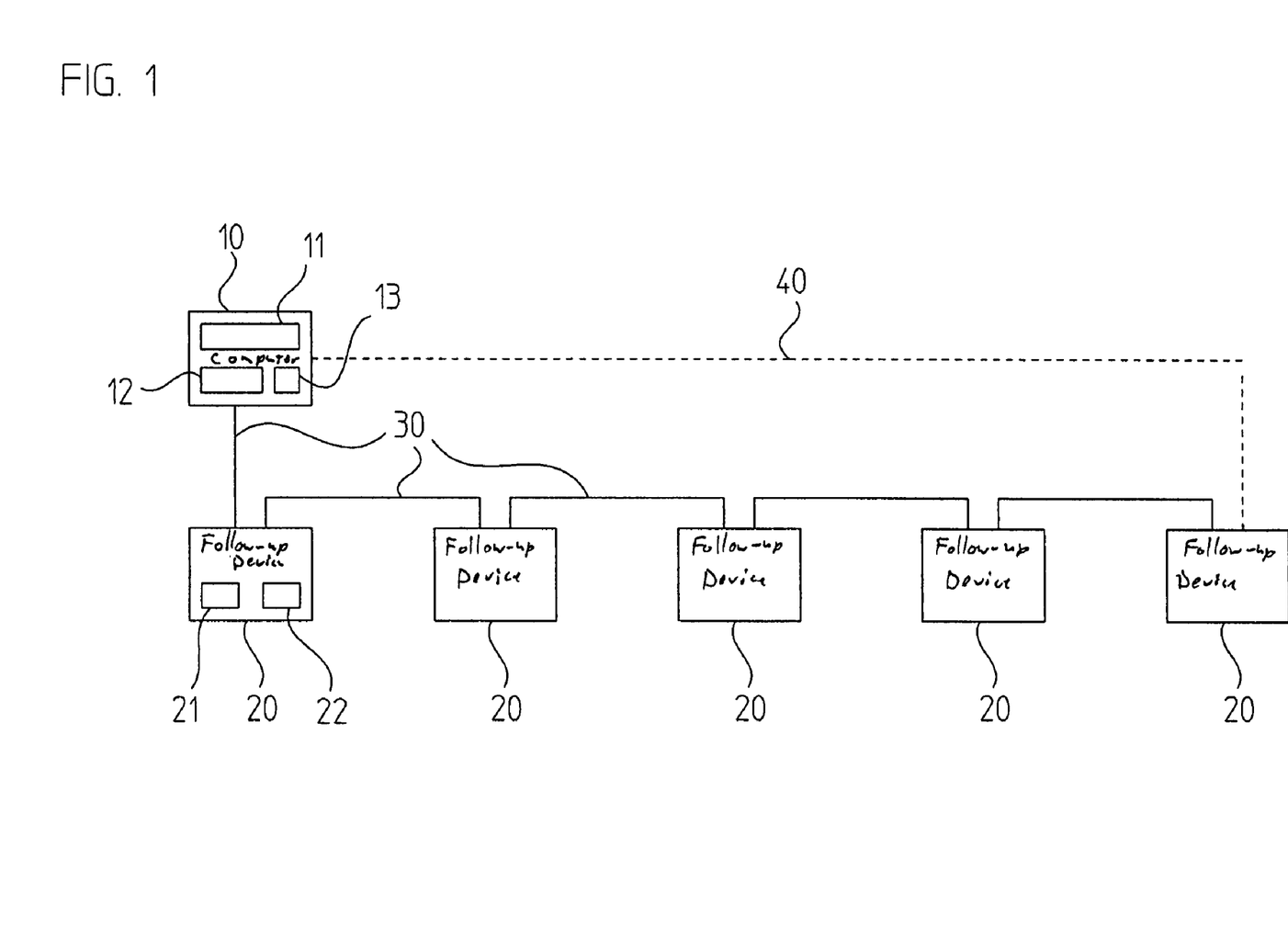
FIG. 1 shows a block diagram of a first embodiment of a numerical control of machine tools and production machinery in accordance with the present invention.

FIG. 1 shows a block diagram of a numerical control in accordance with the present invention. The numerical control includes a main computer 10 and a number of follow-up devices 20, which are connected with each other via a data transmission network 30 in the form of a series connection. Typical follow-up devices 20 in numerical controls are, for example, control units, inverter modules, or also programmable logic controls (PLCs).

Any desired interface architectures which permit a bi-directional data exchange between the main computer 10 and the follow-up devices 20 can be used for the data transmission network 30. However, since the main computer 10 and the follow-up devices 20 are often arranged spatially separated, serial interfaces are particularly suited for the construction of the data transmission network 30 because of the low number of lines required for data transmission. In the example represented, the data transmission network 30 includes point-to-point connections. A suitable and widely used serial data interface, which can be employed particularly advantageously for forming the data transmission network 30, is primarily known from the field of local area networks (LANs), and is identified as FAST ETHERNET (IEEE standard 802.3-2002).

The exchange of data in a data transmission network as represented in FIG. 1 can take place in such a way, for example, that the main computer 10 transmits serial data packets, which are received by the follow-up devices 20 along the serial connection, evaluated and passed on to the respectively next follow-up device 20. It is possible to positively select follow-up devices 20 by the address information contained in the data packets.

When a data packet reaches the last follow-up device 20 in the serial connection, there are basically two options for returning the data packet to the main computer 10. The first option is that the last follow-up device 20 returns the data packet along the series connection in the direction of the main computer. In this way all data packets pass all follow-up devices 20 twice. This can be used in such a way, for example, that the addressed follow-up devices 20 extract data from the data packets in the one direction (writing access by the main computer 10 to the follow-up devices 20) and in the other direction data is inserted in the data packets from the follow-up devices (reading access by the main computer 10 from the follow-up devices 20). The second option for returning data packets to the main computer 10 includes having the last follow-up device 20 in the series connection again connected with the main computer 10 via a further data transmission line 40. A ring structure is formed by this, through which data packets are conducted from the last follow-up device 20 of the series connection directly back to the main computer 10. This option is indicated by a dashed line in FIG. 1.

The main computer 10 includes a display screen 11, an input device 12 and a memory unit 13. The input device 12 can be a keyboard, a mouse, a touchpad, etc., for example. A non-volatile memory is advantageously used as the memory unit 13. As one skilled in the art knows, the main computer 10 can of course contain still further components. However, these are not relevant for the instant invention and will therefore not be described.

Furthermore, each of the follow-up devices 20 contains a signal unit 21 and an operating element 22. Preferably the signal unit 21 is embodied in the form of a light-emitting device for optically signaling events, a keying device can be employed as the operating element 22. The signal unit 21 is advantageously configured in such a way that it can be switched on, or off again, from the main computer 10 via the data transmission network 30.

In order to be able to construct a numerical control as flexibly as possible, and in particular to be able to design the programs which must be processed in the main computer 10 largely independently of the physical design of the follow-up devices 20, the follow-up devices 20 are preferably addressed by the main computer 10 via a logical address LA. A hardware address HA is allocated in turn to the logical address LA, which contains information as to how the follow-up device 20 can be physically addressed via the data transmission network 30. The allocation information between the logical address LA and the hardware address HA is advantageously stored in the form of a parameter data set PM in the memory unit 13.

In connection with the initial start-up of a machine tool or production machinery in particular, the allocation between the logical address LA and the hardware address HA is still unknown. The main computer 10 can only determine the existing number of follow-up devices 20 by the data transmission network 30 and can scan for their hardware addresses HA. Thus, although the topology of the data transmission network 30 is known to the main computer 10, and each follow-up device 20 can be individually contacted, processing of programs for controlling the machine tool or production machinery is not possible because of the lack of allocation between the logical address LA and the hardware address HA.

A first method will now be described by FIGS. 2 and 3, which allows the allocation of the logical address LA of the follow-up device 20 to the associated hardware address HA. Here, FIG. 2 shows a flow diagram of this method, and FIG. 3 an example of a parameter data set PM.

Figure 2:
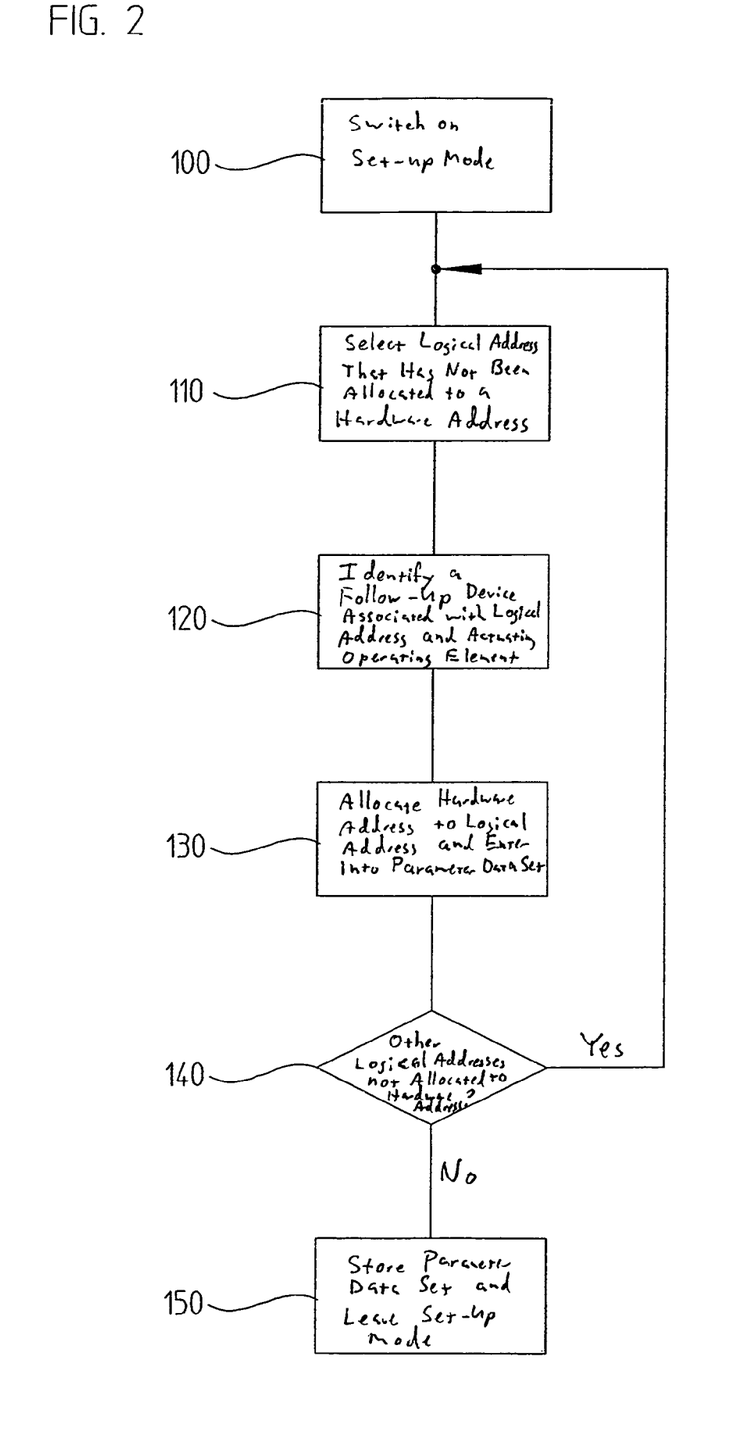
FIG. 2 is a flow diagram of a first embodiment of a method for starting up the numerical control of FIG. 1 in accordance with the present invention.

At the start of the method described in FIG. 2, a set-up mode of operation is switched on in a step 100. This switch can take place automatically, for example when, after switching on the machine tool or processing machinery, in the course of initializing the individual components the main computer 10 discovers by the parameter data set PM that not every needed logical address LA has been allocated a hardware address HA, or that there are hardware addresses HA which have not been allocated to a logical address LA. It is of course also possible to provide a manual switch via the input device 12 and the display screen 11 of the main computer 10.

In step 110, the main computer 10 selects a logical address LA to which no hardware address HA, i.e. no follow-up device 20, has yet been allocated, from the parameter data set PM and requests allocation information from an operator, for example by outputting the logical address LA on the display screen 11.

In step 120 the operator identifies the associated follow-up device 20 by the logical address and actuates its operating element 22. In this exemplary embodiment the operating element 22 can perhaps be configured in such a way that in the course of its actuation, perhaps by an operator, the follow-up device 20 sends its hardware address HA to the main computer 10 via the data transmission network 30. A further possibility would be that the follow-up device 20 stores the actuation of the operating element 22 and only transmits the hardware address HA upon a request from the main computer 10.

Now the main computer 10 can allocate the received hardware address. HA to the logical address LA in step 130 and can enter it into the parameter data set PM, for example. Since at this time the operator is present at the follow-up device 20, it makes sense for the main computer 10 to switch on the signal unit 21 of the actual follow-up device 20 in order to signal the successful allocation.

Thereafter, in step 140, the main computer 10 checks for further logical addresses LA to which hardware addresses HA have not yet been allocated. If this is the case, the method is continued with step 110.

After all logical addresses LA contained in the parameter data set PM have finally been allocated a hardware address HA, in step 150 the main computer 10 stores the now completely filled parameter data set PM in the memory unit 13, for example a hard disk, an EEPROM, or other non-volatile memory, and leaves the start-up mode of operation.

Figure 3:
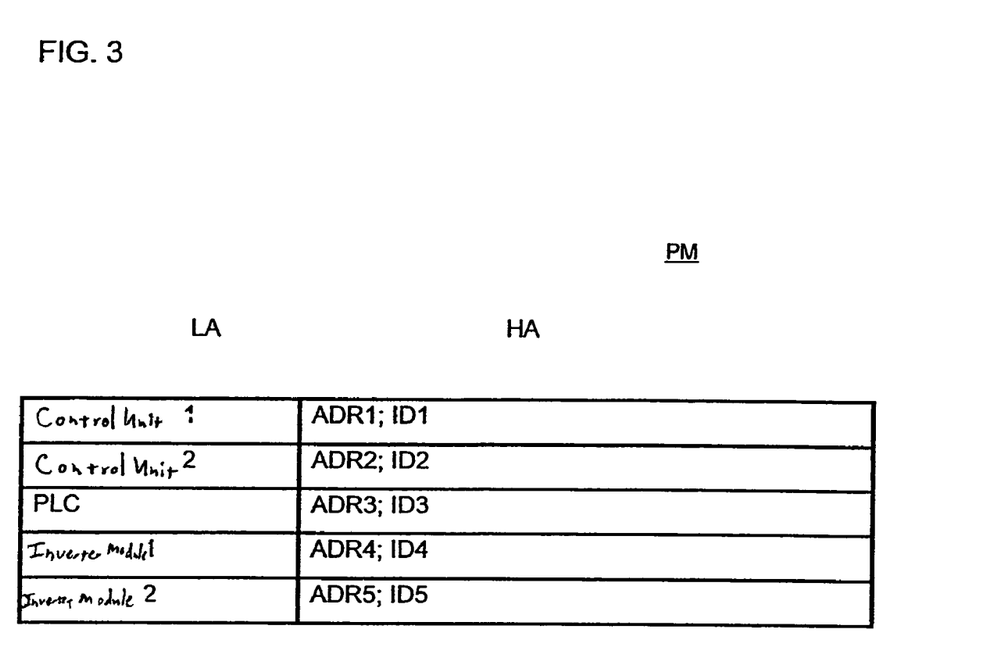
FIG. 3 is a first example of a parameter data set.

FIG. 3 shows by way of example a parameter data set PM. It is constructed in the form of a table and contains in the left column a list of logical addresses LA, to which hardware address HA are allocated in the right column. The actual design of the parameter data set PM can of course be as desired.

As can be seen in FIG. 3, the hardware address HA includes two components, a bus address ADR and an identifier ID. In this case the bus address ADR contains the position of the follow-up device 20 in the data transmission network 30, in the simplest case a consecutive number of the follow-up devices 20 in the serial connection, and is therefore sufficient for being able to unequivocally address the follow-up device 20. However, it is particularly advantageous if the hardware address HA in addition contains the identifier. ID, through which the follow-up device 20 is unequivocally identified, for example by a serial number, if desired together with a device identification.

An example of this: if the follow-up device 20 must be replaced because of a defect, the new follow-up device 20 is located at the same place in the data transmission network 30. It can therefore still be addressed via the bus address ADR, the main computer 10 cannot detect the exchange of the follow-up device 20. However, often follow-up devices 20 must first be initialized prior to their first employment in a machine tool or production machinery, for example by the transfer of calibration data. It is also possible that, although the new follow-up device 20 is of the same type, it is a different version of the device. In both cases an intervention by an operator is required. If the hardware address HA contains an identifier ID, the main computer 10 can determine the replacement of a follow-up device 20 by a comparison of the identifier ID contained in the parameter data set PM and, by issuing a warning report on the display screen 11 or by the automatic activation of the set-up mode of operation, can force the operator to take the required steps.

Figure 4:
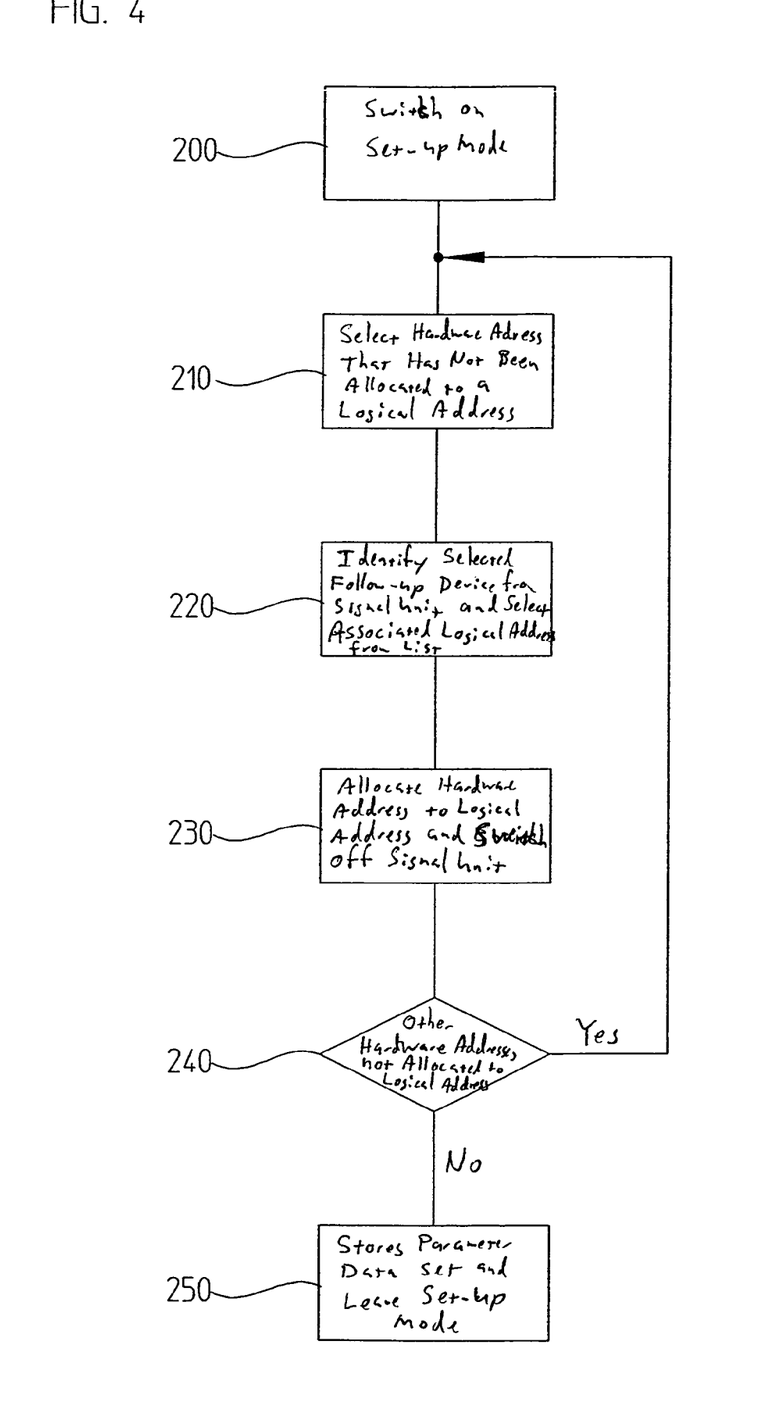
FIG. 4 is a flow diagram of a second embodiment of a method for starting up the numerical control of FIG. 1 in accordance with the present invention.

A further example of a method in accordance with the present invention for starting-up a numerical control of machine tools and production machinery is represented in FIG. 4.

At the start of the method, in a step 200 a set-up mode of operation is also switched on automatically or manually.

In step 210, the main computer 10 selects a hardware address HA to which no logical address LA has been allocated and requests allocation information from an operator by activating the signal unit 21 of the follow-up device 20 to which the hardware address HA belongs and by outputting a list of logical addresses LA, which have not yet been allocated a hardware address HA, on the display screen 11.

In step 220, the operator identifies the selected follow-up device 20 by the activated signal unit 21 and selects the associated logical address LA from the list displayed on the display screen 11 via the input device 12. The selection can be made in the most diverse manner, for example via cursor keys of a keyboard, or by a mouse.

Now, in step 230, the main computer 10 can enter the allocation of the hardware address HA to the logical address LA in the parameter data set PM and can again switch off the signal unit 21 of the actual follow-up device 20.

The main computer 10 subsequently checks in step 240 whether there are further hardware addresses HA to which no logical addresses LA have been allocated. If this is the case, the method is continued with step 210.

After finally all hardware addresses HA been allocated logical addresses LA, in step 250 the main computer 10 stores the now completely filled parameter data set PM in the memory unit 13 and leaves the start-up mode of operation.

Figure 5:
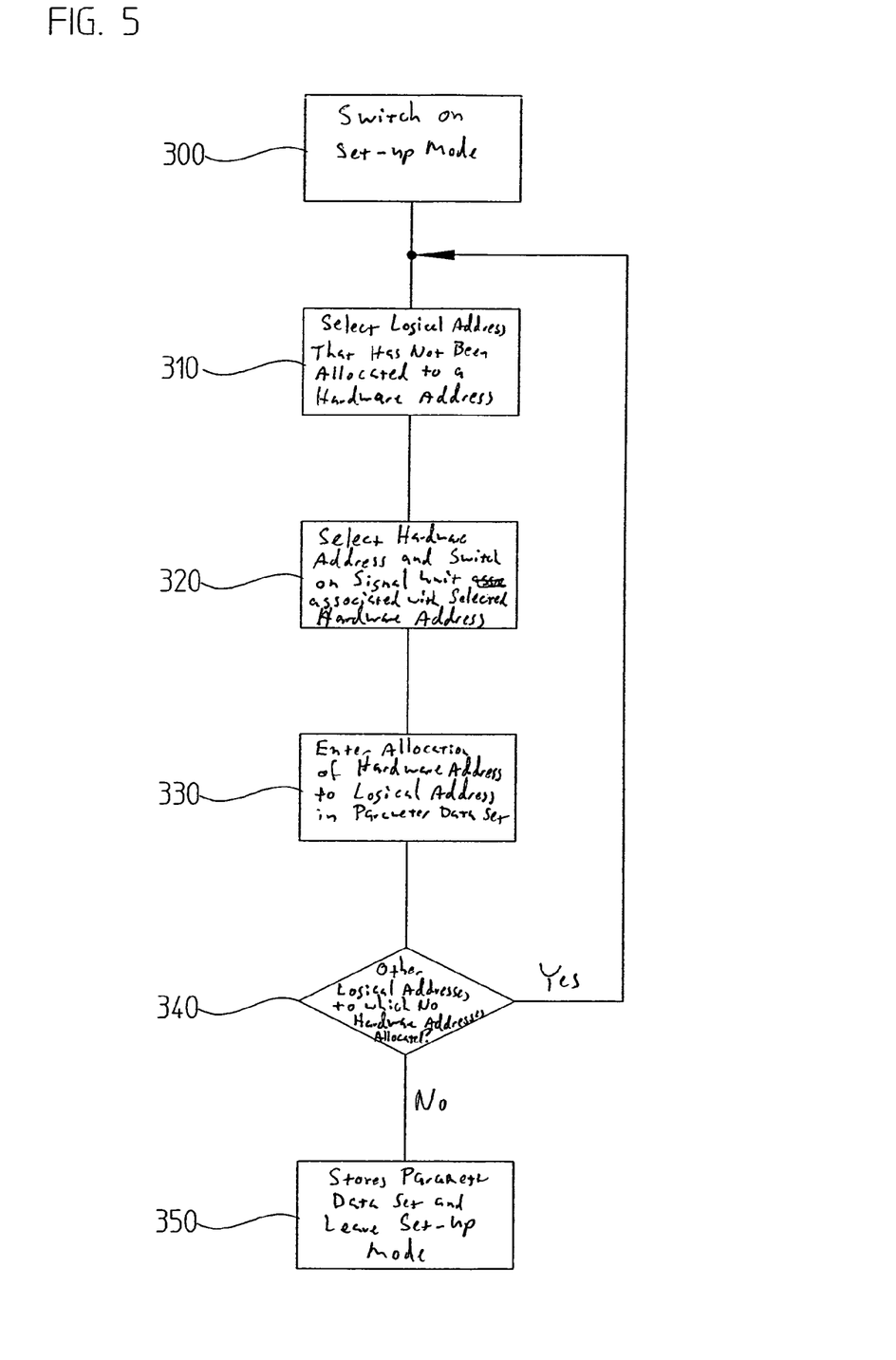
FIG. 5 is a flow diagram of a third embodiment of a method for starting up the numerical control of FIG. 1 in accordance with the present invention.

FIG. 5 shows a further example of a method in accordance with the present invention for starting-up a numerical control of machine tools and production machinery.

At the start of the method, in a step 300 a set-up mode of operation is again switched on.

In step 310 the main computer 10 selects a logical address LA to which no hardware address HA has been allocated and requests allocation information from an operator by outputting the logical address LA of a follow-up device 20 to be allocated, as well as a list of hardware addresses HA, to which no logical address LA has been allocated yet on the display screen 11.

Thereupon, in step 320, the operator sequentially selects hardware addresses HA from the list, for example by a keyboard, whereupon the main computer 10 switches the signal unit 21 of the actual follow-up device 20 determined by the selected hardware address HA. If by the switched-on signal unit 21 the operator recognizes that the actually selected follow-up device 20 belongs to the desired logical address LA, he confirms the successful allocation to the main computer 10 via the input device 12.

Now, in step 320 the main computer 10 can enter the allocation of the hardware address HA to the logical address LA in the parameter data set PM.

The main computer 10 subsequently checks in step 340 whether there are further logical addresses LA to which no hardware addresses HA has been allocated. If this is the case, the method is continued with step 310.

Finally, after hardware addresses have been allocated to all logical addresses LA, in step 350 the main computer 10 stores the now completely filled parameter data set PM in the memory unit 13 and leaves the start-up mode of operation.

It is particularly advantageous in connection with the second and third described methods that no operating elements 22 are required on the part of the follow-up devices 20. For one, it is possible by this to reduce the costs of the follow-up devices 22, and furthermore this method is also suitable for simple retrofitting of already existing numerical controls for machine tools or production machinery, whose follow-up devices 20 are not equipped with operating elements 22.

Figure 6:
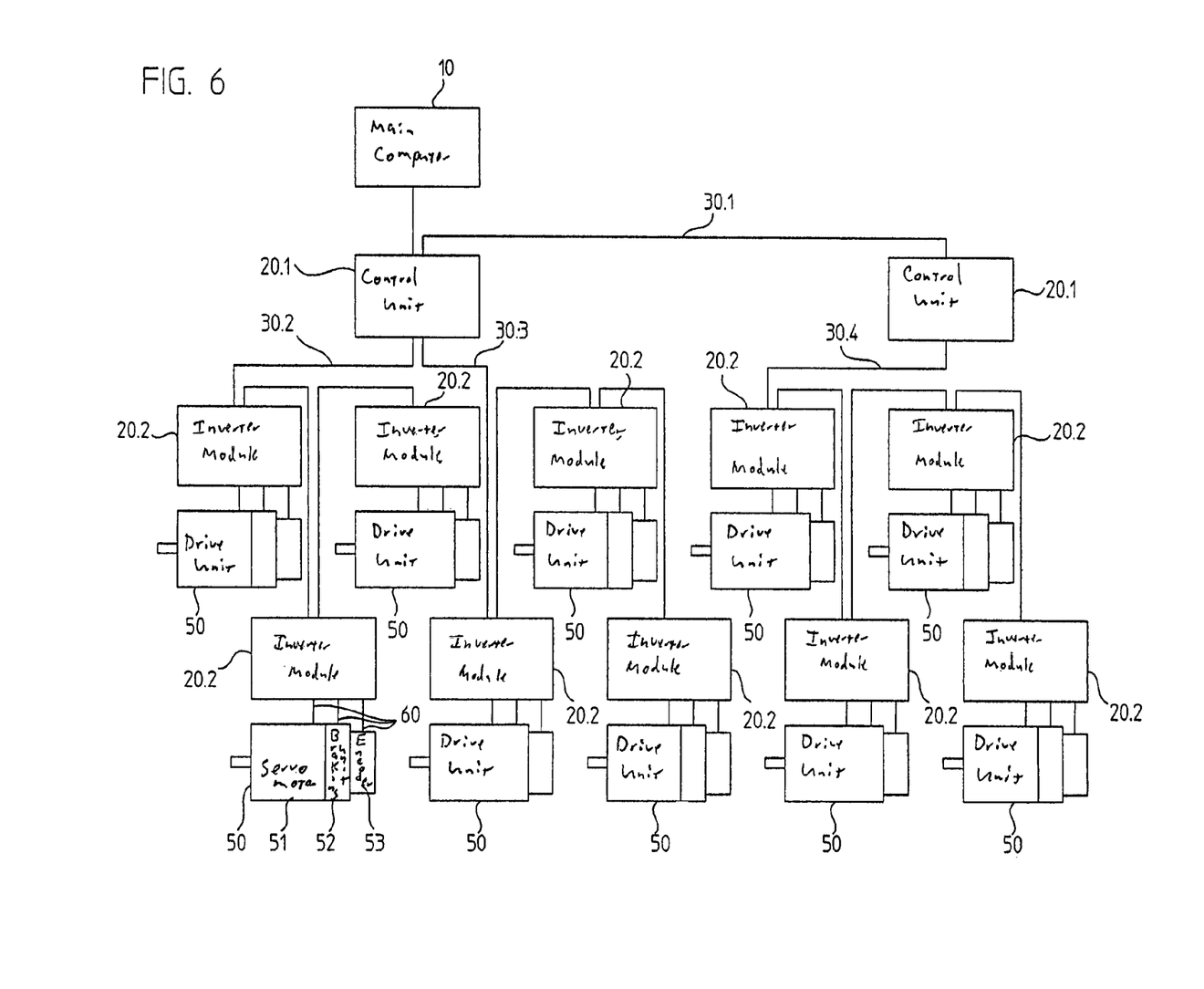
FIG. 6 is a block diagram of a further embodiment of a numerical control in accordance with the present invention.

FIG. 6 shows a further example of a numerical control for machine tools and production machinery. In this case the follow-up devices 20 are arranged on two levels of hierarchy. The follow-up devices 20 of the first hierarchy level 20.1 are connected via a first network string 30.1 with the main computer 10. The follow-up devices 20 of the second hierarchy level 20.2 are connected via second, third and fourth network strings 30.2, 30.3, 30.4 to the follow-up devices of the first hierarchy level 20.1. Therefore the data transmission network 30 in this exemplary embodiment consists of the network strings 30.1, 30.2, 30.3, 30.4.

The follow-up devices of the first hierarchy level 20.1 are control units 20.1, the follow-up devices of the second hierarchy level 20.2 are inverter modules 20.2. Drive units 50, including a servo motor 51, a braking unit 52 and an angle encoder 53, are represented by way of example at the inverter modules 20.2. The former are often also equipped with digital data transfer interfaces 60, through which device-specific data can be transmitted to the inverter modules 20.2, and from there to the main computer 10 via the data transmission network 30. To complete the picture it should be noted that several drive units 50 of different types can be present at an inverter module 20.2. It is also possible to connect any desired different units serving various functions to other follow-up units 20.

The methods represented in FIGS. 2, 4 and 5 can also be employed with this network structure. However, since the main computer 10 is no longer directly connected via a network string with the follow-up devices 20 on the second hierarchy level, communications can take place in two steps, for example: from the main computer 10 to the follow-up devices of the first hierarchy level 20.1 and from there in a second step to the follow-up devices of the second hierarchy level 20.2. So that the main computer 10 can address the follow-up devices of the second hierarchy level 20.2, the bus address ADR contains, besides the position of the follow-up device 20 within a network string, also information regarding the network string 30.1, 30.2, 30.3, 30.4 in which the respective follow-up device 20 is located.

Figure 7:
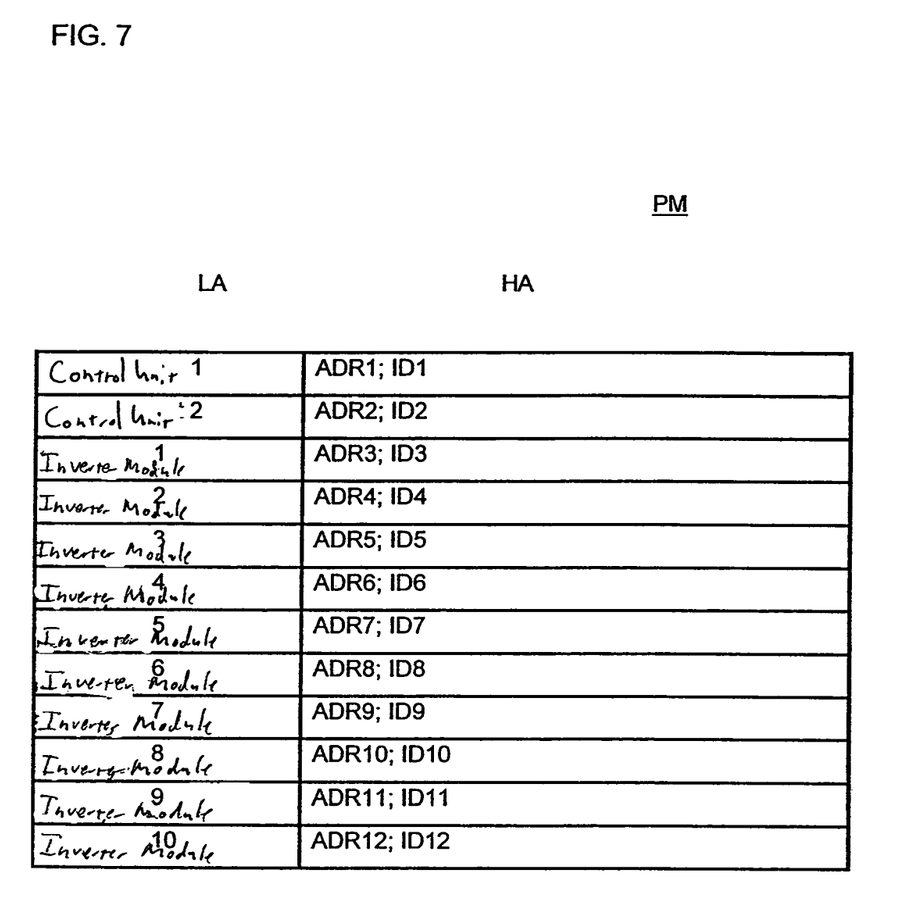
FIG. 7 is a second example of a parameter data set.

A parameter data set PM for the numerical control for machine tools and production machinery represented in FIG. 6 is represented in FIG. 7. As in the previous examples, the logical addresses LA of the follow-up devices 20 are located in the left column, and in the right column their hardware addresses HA. Different from the previous case, the bus addresses ADR now contain information regarding the network string 30.1, 30.2, 30.3, 30.4 in which the follow-up device 20 to be addressed is located, as well as a consecutive number identifying the position of the follow-up device 20 in the network string.

The method in accordance with the present invention can of course also be applied in other network topologies. In the same way, depending on the structure of the data transmission network 30, the hardware address HA can contain information differing from the described exemplary embodiments for physically addressing a follow-up device 20.

The foregoing description is provided to illustrate the present invention, and is not to be construed as a limitation. Numerous additions, substitutions and other changes can be made to the present invention without departing from its scope as set forth in the appended claims.

We claim:

1. A method for the start-up of a numerical control of machine tools or production machinery, wherein said numerical control comprises a main computer and a follow-up device, which are connected with each other via a data transmission network, wherein said follow-up device is addressable by said main computer via a logical address and a hardware address, and wherein information regarding a physical address of said follow-up device in said data transmission network is allocated to said logical address, the method comprising:

performing via said main computer the following: sequentially requesting, in a set-up mode of operation of said main computer, allocating information regarding a logical address and a hardware address from an operator for said follow-up device and other follow-up devices to whose logical address no hardware address had been allocated;

said operator performing a task in response to said sequentially requesting that enables said main computer to allocate said hardware address to said logical address;

upon said operator performing said task, said main computer allocating said hardware address to said logical address;

storing said logical address and said hardware address in a memory unit after said allocating said hardware address to said logical address has been performed by said main computer; and outputting via said main computer said requesting for allocating information in a form of said logical address of said follow-up device to be allocated on a display screen; and said task comprising initiating transmission of said hardware address from said follow-up device to said main computer by said operator actuating an operating element at said follow-up device to be allocated.

2. The method in accordance with claim 1, wherein said hardware address contains a bus address, which provides a position of said follow-up device in said data transmission network.

3. The method in accordance with claim 2, wherein said hardware address further contains an identifier, which unequivocally identifies said follow-up device.

4. The method in accordance with claim 1, further comprising switching on said numerical control, wherein during said switching on said numerical control said main computer checks whether every logical address has been allocated a hardware address and, in case of determining not every logical address has been allocated a hardware address, switching into said set-up mode of operation.

5. The method in accordance with claim 1, wherein said information allocated with said hardware address is stored in the form of a parameter data set.

6. The method in accordance with claim 1, wherein said memory unit is a non-volatile memory.

7. A method for the start-up of a numerical control of machine tools or production machinery, wherein said numerical control comprises a main computer and a follow-up device, which are connected with each other via a data transmission network, wherein said follow-up device is addressable by said main computer via a logical address and a hardware address, and wherein information regarding a physical address of said follow-up device in said data transmission network is allocated to said logical address, the method comprising:

performing via said main computer the following: sequentially requesting, in a set-up mode of operation of said main computer, allocating information regarding a logical address and a hardware address from an operator for said follow-up device and other follow-up devices to whose logical address no hardware address had been allocated, wherein said requesting said allocating information takes place by having said main computer switch on a signal unit of said follow-up device to be allocated by using said hardware address and outputs a list of logical addresses on a display screen;

said operator performing a task in response to said sequentially requesting that enables said main computer to allocate said hardware address to said logical address, wherein said task comprises said operator selecting said logical address belonging to said follow-up device with said switched-on signal unit on said display device;

upon said operator performing said task, said main computer allocating said hardware address to said logical address; and storing said logical address and said hardware address in a memory unit after said allocating said hardware address to said logical address has been performed by said main computer.

8. The method in accordance with claim 7, wherein said hardware address contains a bus address, which provides a position of said follow-up device in said data transmission network.

9. The method in accordance with claim 8, wherein said hardware address further contains an identifier, which unequivocally identifies said follow-up device.

10. The method in accordance with claim 7, further comprising switching on said numerical control, wherein during said switching on said numerical control said main computer checks whether every logical address has been allocated a hardware address and, in case of determining not every logical address has been allocated a hardware address, switching into said set-up mode of operation.

11. The method in accordance with claim 7, wherein said information allocated with said hardware address is stored in the form of a parameter data set.

12. The method in accordance with claim 7, wherein said memory unit is a non-volatile memory.

13. A method for the start-up of a numerical control of machine tools or production machinery, wherein said numerical control comprises a main computer and a follow-up device, which are connected with each other via a data transmission network, wherein said follow-up device is addressable by said main computer via a logical address and a hardware address, and wherein information regarding a physical address of said follow-up device in said data transmission network is allocated to said logical address, the method comprising:

performing via said main computer the following: sequentially requesting, in a set-up mode of operation of said main computer, allocating information regarding a logical address and a hardware address from an operator for said follow-up device and other follow-up devices to whose logical address no hardware address had been allocated;

said operator performing a task in response to said sequentially requesting that enables said main computer to allocate said hardware address to said logical address;

upon said operator performing said task, said main computer allocating said hardware address to said logical address;

storing said logical address and said hardware address in a memory unit after said allocating said hardware address to said logical address has been performed by said main computer; and requesting said allocating said hardware address by having said main computer output said logical address of said follow-up device, as well as a list of hardware addresses of other follow-up devices to which no logical address has yet been allocated, on a display screen; and wherein said task comprises having said operator sequentially selecting said hardware address from said list;

switching on a signal unit of said follow-up device based on said sequentially selected hardware address until allocation is detected by said switched-on signal unit to be allocated and confirms it to said main computer.

14. The method in accordance with claim 13, wherein said hardware address contains a bus address, which provides a position of said follow-up device in said data transmission network.

15. The method in accordance with claim 14, wherein said hardware address further contains an identifier, which unequivocally identifies said follow-up device.

16. The method in accordance with claim 13, further comprising switching on said numerical control, wherein during said switching on said numerical control said main computer checks whether every logical address has been allocated a hardware address and, in case of determining not every logical address has been allocated a hardware address, switching into said set-up mode of operation.

17. The method in accordance with claim 13, wherein said information allocated with said hardware address is stored in the form of a parameter data set.

18. The method in accordance with claim 13, wherein said memory unit is a non-volatile memory.

19. A numerical control for machine tools or production machinery, comprising:
 a main computer;
 a display screen in communication with said main computer;
 a follow-up device connected with said main computer via a data transmission network, wherein said follow-up device is addressable by said main computer via a logical address and a hardware address with information regarding a physical address of said follow-up device in said data transmission network is allocated to said logical address, wherein said main computer and said follow-up device are designed for carrying out a method for the start-up of a numerical control of machine tools or production machinery, the method comprising:
  performing via said main computer the following: 1) sequentially requesting, in a set-up mode of operation of said main computer, allocating information regarding a logical address and a hardware address from an operator for said follow-up device and other follow-up devices to whose logical address no hardware address had been allocated and 2) outputting said requesting for allocating information in a form of said logical address of said follow-up device to be allocated on said display screen;
  said operator performing a task in response to said sequentially requesting that enables said main computer to allocate said hardware address to said logical address, wherein said task comprises initiating transmission of said hardware address from said follow-up device to said main computer by said operator actuating an operating element at said follow-up device to be allocated;
  upon said operator performing said task, said main computer allocating said hardware address to said logical address; and
  storing said logical address and said hardware address in a memory unit after said allocating said hardware address to said logical address information has been performed by said main computer.

20. The numerical control in accordance with claim 19, wherein said data transmission system comprises serial point-to-point connections.

21. A numerical control for machine tools or production machinery, comprising:
 a main computer;
 a display screen in communication with said main computer;
 a follow-up device connected with said main computer via a data transmission network, wherein said follow-up device is addressable by said main computer via a logical address and a hardware address with information regarding a physical address of said follow-up device in said data transmission network is allocated to said logical address, wherein said main computer and said follow-up device are designed for carrying out a method for the start-up of a numerical control of machine tools or production machinery, the method comprising:
  performing via said main computer the following:
   sequentially requesting, in a set-up mode of operation of said main computer, allocating information regarding a logical address and a hardware address from an operator for said follow-up device and other follow-up devices to whose logical address no hardware address had been allocated, wherein said requesting said allocating information takes place by having said main computer switch on a signal unit of said follow-up device to be allocated by using said hardware address and outputs a list of logical addresses on said display screen;
  said operator performing a task in response to said sequentially requesting that enables said main computer to allocate said hardware address to said logical address, wherein said task comprises said operator selecting said logical address belonging to said follow-up device with said switched-on signal unit on said display device;
  upon said operator performing said task, said main computer allocating said hardware address to said logical address; and
  storing said logical address and said hardware address in a memory unit after said allocating said hardware address to said logical address information has been performed by said main computer.

22. The numerical control in accordance with claim 21, wherein said data transmission system comprises serial point-to-point connections.

23. A numerical control for machine tools or production machinery, comprising:
 a main computer;
 a display screen in communication with said main computer;
 a follow-up device connected with said main computer via a data transmission network, wherein said follow-up device is addressable by said main computer via a logical address and a hardware address with information regarding a physical address of said follow-up device in said data transmission network is allocated to said logical address, wherein said main computer and said follow-up device are designed for carrying out a method for the start-up of a numerical control of machine tools or production machinery, the method comprising:
  performing via said main computer the following:
   sequentially requesting, in a set-up mode of operation of said main computer, allocating information regarding a logical address and a hardware address from an operator for said follow-up device and other follow-up devices to whose logical address no hardware address had been allocated, wherein said requesting said allocating information regarding said hardware address takes place by having said main computer output said logical address of said follow-up device, as well as a list of hardware addresses of other follow-up devices to which no logical address has yet been allocated, on said display screen;

said operator sequentially selecting said hardware address from said list in response to said sequentially requesting that enables said main computer to allocate said hardware address to said logical address, wherein said task comprises said operator selecting said logical address belonging to said follow-up device with said switched-on signal unit on said display device;

upon said operator performing said sequentially selecting said hardware address from said list, said main computer allocating said hardware address to said logical address;

storing said logical address and said hardware address in a memory unit after said allocating said hardware address to said logical address information has been performed by said main computer; and switching on a signal unit of said follow-up device based on said sequentially selected hardware address until allocation is detected by said switched-on signal unit to be allocated and confirms it to said main computer.

24. The numerical control in accordance with claim 23, wherein said data transmission system comprises serial point-to-point connections.

* * * * *